US012753844B2

(12) United States Patent
Cobb et al.

(10) Patent No.: US 12,753,844 B2
(45) Date of Patent: Oct. 6, 2026

(54) FLUID CONTROL VALVE WITH DIAPHRAGM TENSIONING GEOMETRY

(71) Applicant: Equilibar, LLC, Fletcher, NC (US)

(72) Inventors: Zachary Allan Cobb, Fletcher, NC (US); Holly Ledwell, Fletcher, NC (US); Jeffrey Dean Jennings, Fletcher, NC (US)

(73) Assignee: Equilibar, LLC, Fletcher, NC (US)

( * ) Notice: Subject to any disclaimer, the term of this patent is extended or adjusted under 35 U.S.C. 154(b) by 0 days.

(21) Appl. No.: 19/153,731

(22) PCT Filed: Jan. 12, 2024

(86) PCT No.: PCT/US2024/011385
§ 371 (c)(1),
(2) Date: Aug. 5, 2025

(87) PCT Pub. No.: WO2024/151941
PCT Pub. Date: Jul. 18, 2024

(65) Prior Publication Data

US 2026/0251225 A1 Aug. 27, 2026

Related U.S. Application Data

(60) Provisional application No. 63/517,958, filed on Aug. 7, 2023, provisional application No. 63/438,937, filed on Jan. 13, 2023.

(51) Int. Cl.

| | |
|---|---|
| *F16K 7/17* | (2006.01) |
| *F16K 27/02* | (2006.01) |
| *F16K 31/126* | (2006.01) |

(52) U.S. Cl.
CPC ........... *F16K 7/17* (2013.01); *F16K 27/0236* (2013.01); *F16K 31/1266* (2013.01)

(58) Field of Classification Search
CPC ...... F16K 7/17; F16K 31/126; F16K 31/1266; F16K 27/0236; G05D 16/024; G05D 16/063
See application file for complete search history.

(56) References Cited

U.S. PATENT DOCUMENTS 3,083,943 A * 4/1963 Stewart, Jr. ......... F16K 31/1266 D23/233
3,260,274 A * 7/1966 Morgan, Jr. ........ F16K 31/1266 137/113

(Continued)

*Primary Examiner* — David Colon-Morales
(74) *Attorney, Agent, or Firm* — Shumaker, Loop & Kendrick, LLP

(57) ABSTRACT

A fluid control valve includes: a metallic body, including: a process surface with a central portion, a body clamping surface, and a body step between the central portion and the body clamping surface; at least one inlet orifice; at least one outlet orifice; an inlet port; and an outlet port; a metallic cap including a reference port, and a reference surface including: a cavity; a pressure pad; a cap clamping surface; and a cap step between the pressure pad and the cap clamping surface; and a metallic diaphragm between the body and the cap arranged such that, in response to a process pressure being higher than a reference pressure, a fluid flow path will be open from the inlet orifice to the outlet orifice, and in response to the reference pressure being higher than the process pressure, the flow path will be closed.

18 Claims, 7 Drawing Sheets

(56) References Cited

U.S. PATENT DOCUMENTS

| | | | | | |
|---|---|---|---|---|---|
| 3,856,046 | A * | 12/1974 | Brown | F16K 7/17 | 251/61.1 |
| 4,168,724 | A * | 9/1979 | Graffunder | B01J 19/0046 | 137/884 |
| 4,846,215 | A * | 7/1989 | Barree | F16K 7/17 | 137/859 |
| 4,852,851 | A * | 8/1989 | Webster | F16K 11/022 | 137/884 |
| 4,858,883 | A * | 8/1989 | Webster | F16K 11/022 | 137/884 |
| 5,496,009 | A * | 3/1996 | Farrell | F15C 5/00 | 251/25 |
| 5,529,280 | A * | 6/1996 | Satoh | F16K 7/17 | 251/61.1 |
| 5,762,314 | A * | 6/1998 | Williams | F16K 7/17 | 251/367 |
| 6,196,521 | B1 * | 3/2001 | Hynes | F16K 7/17 | 251/61 |
| 7,673,650 | B2 * | 3/2010 | Jennings | F16K 31/1266 | 137/494 |
| 9,447,890 | B2 * | 9/2016 | Jennings | G05D 16/063 | |
| 10,393,276 | B2 * | 8/2019 | Harbrecht | F16K 7/17 | |
| 10,781,808 | B2 * | 9/2020 | Kawamura | A61B 5/0235 | |
| 10,962,124 | B1 * | 3/2021 | Stanley | F16K 7/123 | |
| 11,193,703 | B1 * | 12/2021 | Heffner | F25B 49/027 | |
| 11,982,377 | B1 * | 5/2024 | Myers | F16K 99/0059 | |

* cited by examiner

FLUID CONTROL VALVE WITH DIAPHRAGM TENSIONING GEOMETRY

BACKGROUND

In demanding fluid control applications with high temperatures and/or aggressive chemical makeups, elastomeric seals often are a weak link due to their relative lack of toughness when exposed to challenging conditions. Oftentimes elastomers have temperature limitations that cannot service applications that exceed 300 degrees Celsius. While specialty elastomers exist that can operate at these temperatures, they often come with high consumer costs.

Additionally, elastomeric seals can experience chemical compatibility issues with exotic process fluids, rendering them unusable in demanding applications. These durability issues are exacerbated at elevated temperatures and pressures.

Furthermore, elastomeric seals have shown to be permeable by small molecule gasses such as hydrogen gas or helium. This is a problem in fluid control applications where even small leaks can cause large problems.

For the reasons mentioned above, it is desirable in the fluid control industry to utilize sealing mechanisms that are free of elastomers entirely, as this allows exploration of elevated or cryogenic temperatures and exotic chemicals without the need for expensive elastomer seals that require frequent replacement. A common commercially available fully metallic seal is the Swagelok VCR® style fittings that are used in tubing systems. In this type of joint, a stainless steel gasket is pressed between two hemispheric bosses and the metal is coined by pressures exceeding yield stresses into the leak-free joint.

Fluids engineers often need to control pressure upstream of a regulator. Backpressure regulators are common devices used to accomplish this task. For accurate control over a wide range of flow rates, multiple orifice dome loaded diaphragm valves such as the Equilibar® are exceptionally good options. Traditionally these valves use a combination of metallic "shell" components with various polymer soft goods internally. Metallic diaphragms are sometimes used in these units, though typically with elastomeric O-rings or sometimes C-type metallic rings. One main problem with C-type rings is that they often have small leaks in nitrogen- or oxygen-sized gas molecules with even more difficulty getting these rings to create good seals for small molecules.

For the reasons mentioned above, it is desirable to have a fully metallic sealing elements inside of the regulator, as this allows for operation in the demanding applications covered earlier. Seals need to be made on either side of a control diaphragm to contain process fluids, however, traditional fully metallic seals such as the Swagelok VCR fittings accomplish a seal by deformation of a consumable gasket.

To create this seal on a control diaphragm comes with the unintended consequence of deforming the control diaphragm by pushing some of the yielded material inside the periphery of the valve. Upon pressurization, this excess material can form a wrinkle when pressed upon the flat surface of the valve. Wrinkled metal diaphragms can be useless for controlling low flow fluid flow rates (their primary application). It is desirable to preserve the flatness of control diaphragms for steady operation in a dome loaded diaphragm fluid control valves, more specifically: dome-loaded, multi-orifice backpressure regulators such as the Equilibar product.

What is Needed:

To accomplish precise fluid pressure control of systems with aggressive chemicals and temperatures outside of elastomeric seal limitations, a fully metallic fluid control valve is needed. Additionally, this seal should operate such that it does not cause excessive deformation of the control diaphragm, compromising its ability to seal on planar surfaces. What is needed is a mechanism that can direct distortion away from the control surface of the regulator, while creating a leak free seal.

BRIEF SUMMARY OF THE INVENTION

This need is addressed by a fluid control valve having a step configuration which retains a metallic diaphragm between a body and a cap.

According to one aspect of the technology described herein, 1. A fluid control valve includes: a metallic body, including: a process surface, including: a central portion; a body clamping surface adjacent the central portion; and a body step between the central portion and the body clamping surface, the body step including an internal corner and an external corner; at least one inlet orifice communicating with the process surface; at least one outlet orifice communicating with the process surface; an inlet port disposed in fluid communication with the at least one inlet orifice and adapted to be coupled in fluid communication with a fluid at a process pressure; and an outlet port disposed in fluid communication with the at least one outlet orifice; a metallic cap including a reference surface and a reference port disposed in fluid communication with the reference surface, the reference port adapted to be coupled in fluid communication with a fluid at a predetermined reference pressure, wherein the reference surface includes: a cavity; a pressure pad outboard of the cavity; a cap clamping surface; and a cap step between the pressure pad and the cap clamping surface, the cap step including an internal corner and an external corner; and a metallic diaphragm constrained between the body and the cap and arranged such that, in response to the process pressure being higher than the reference pressure, a fluid flow path will be open from the at least one inlet orifice to the outlet orifice, and in response to the reference pressure being higher than the process pressure, the flow path will be closed.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
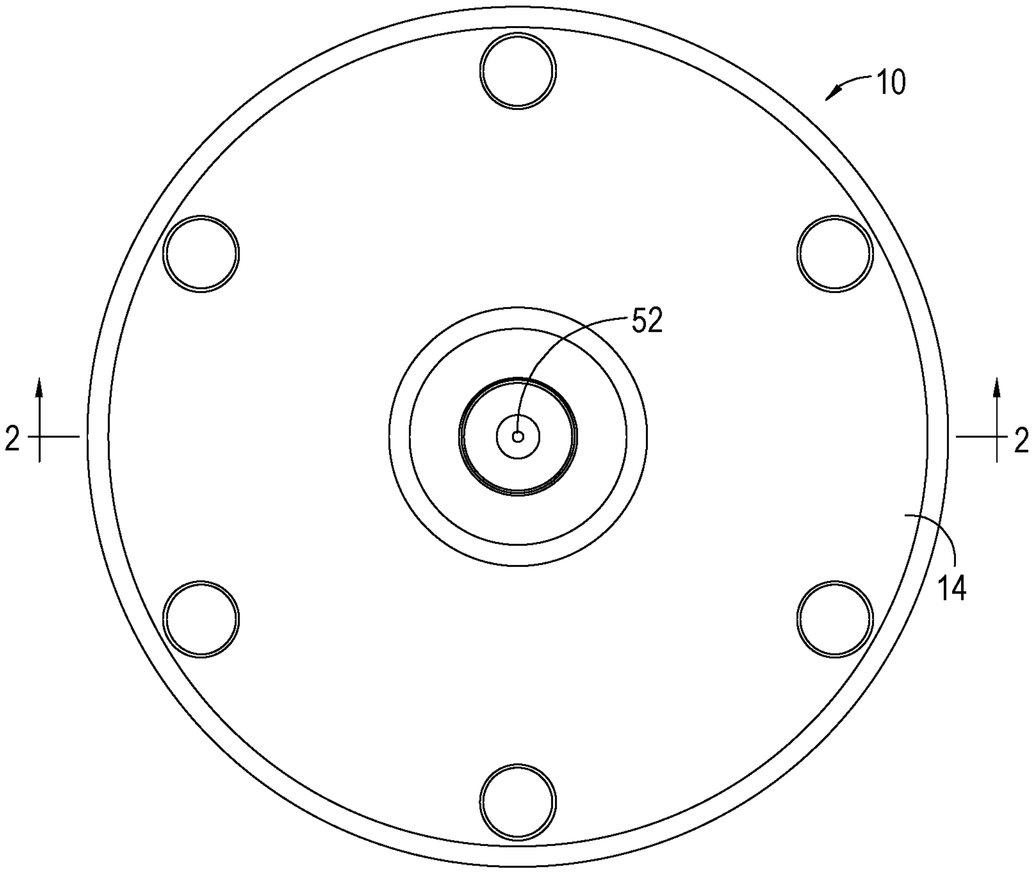
FIG. 1 is a top view of an exemplary fluid control valve.
Figure 2:
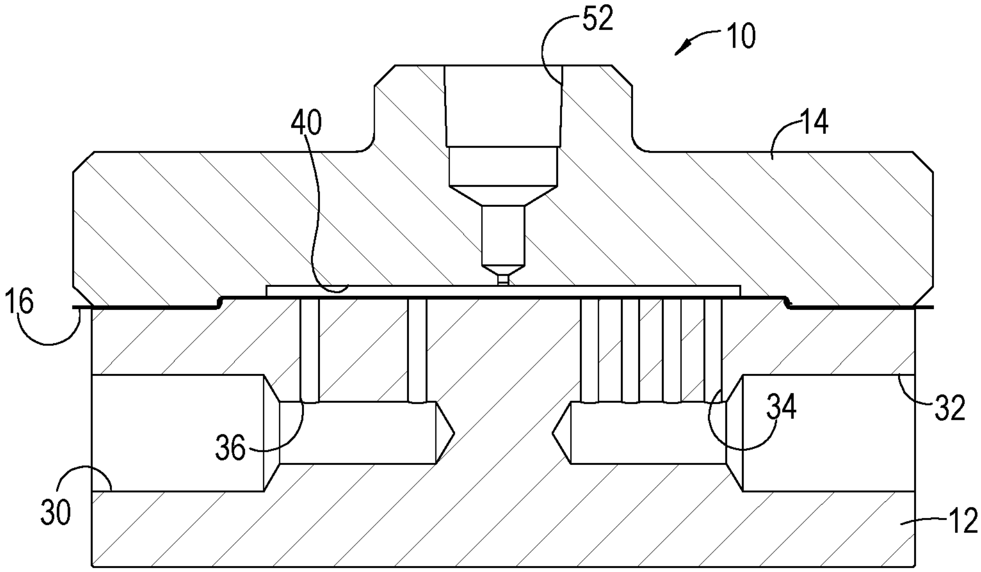
FIG. 2 is a cross-sectional view taken along lines 2-2 of FIG. 1.

Referring to the drawings wherein identical reference numerals denote the same elements throughout the various views, FIGS. 1 and 2 depict an exemplary fluid control valve 10 constructed according to an aspect of the present invention.

The fluid control valve 10 includes a body 12 and a reference cap (or simply "cap") 14. A diaphragm 16 is sandwiched between the body 12 and the cap 14.

The body 12 and its constituent parts may be manufactured using various methods such as machining from a block of precursor material, additive manufacturing processes (e.g., "3-D printing"), or casting.

Figure 3:
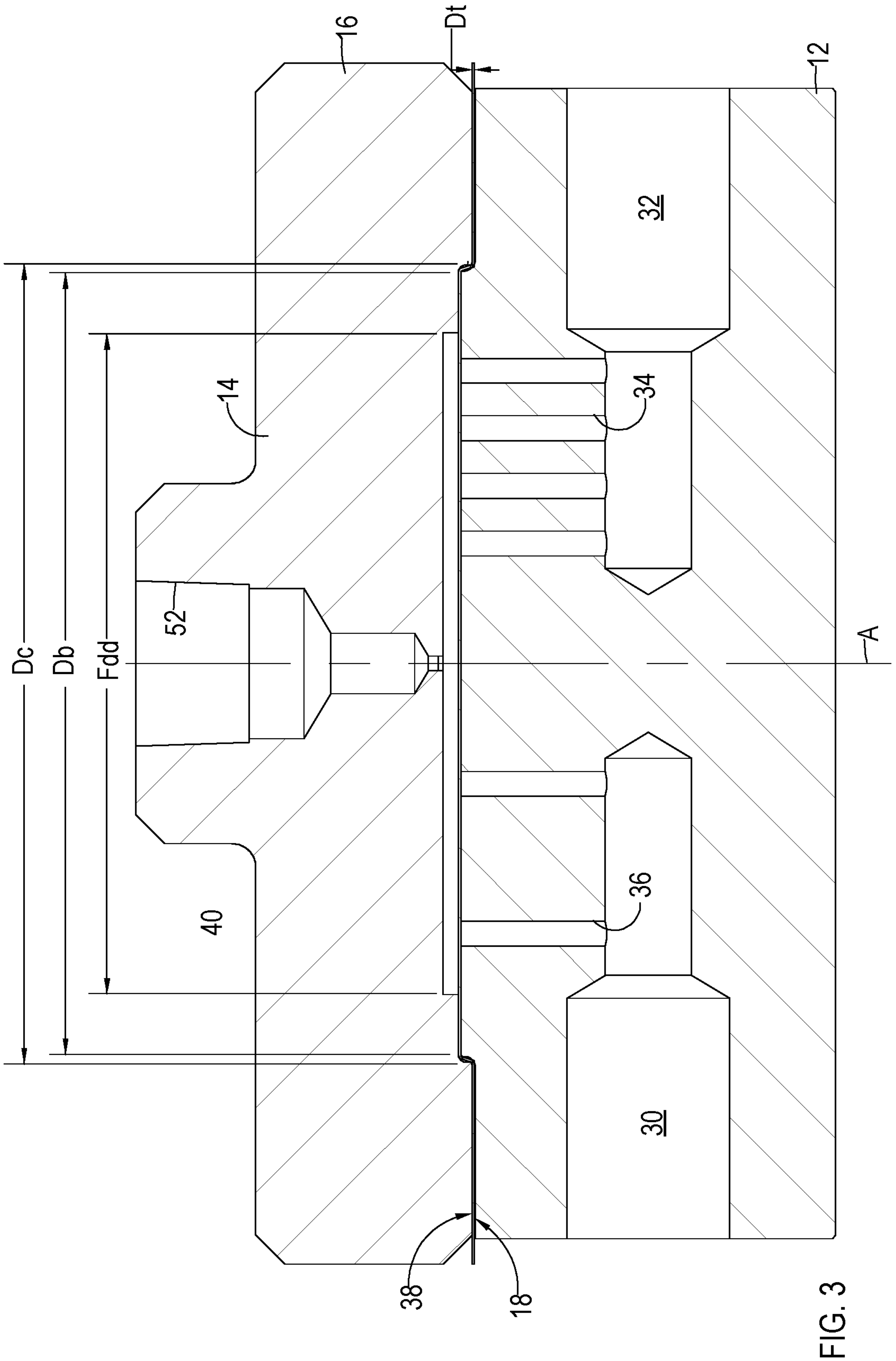
FIG. 3 is an enlarged view of FIG. 2.

The body 12 has a process surface 18. The process surface 18 defines a central portion which may be generally planar. Referring to FIG. 3, outboard of the central portion 20, the process surface 18 includes a body clamping surface 22. The process surface 18 includes a body step 24 which includes an internal corner 26 and an external corner 28. This body step 24 is located between the central portion 20 and the body clamping surface 22, and defines the transition between the two surfaces. In the illustrated example, the central portion 20 protrudes beyond the body clamping surface 22 (relative to the remainder of the body 12). The process surface 18 is described with reference to FIG. 3 in terms of its two-dimensional profile. It will be understood that the process surface 18 is in actuality a three-dimensional entity and may be a body of revolution (e.g., about central axis "A"), or other closed perimeter shape.

Inlet and outlet ports 30 and 32 are also formed in the body 12. The central axes of these ports may be coplanar or substantially coplanar with each other, and the plane of these axes may be parallel with the central portion 20. These two ports 30 and 32 may be diametrically opposed relative to the body 12 and co-axial with each other as well.

At least one outlet orifice 34 is disposed in fluid communication with the outlet port 32 and the central portion 20.

At least one inlet orifice 36 is disposed in fluid communication with the inlet port 30 and the central portion 20. The function of the inlet orifice (or orifices) 36 is to bring the process fluid into the fluid control valve 10.

The cap 14 (see FIG. 3) may be cast, machined, or built-up from separate components. The cap 14 has a reference surface 38. The reference surface 38 defines a cavity 40 to allow movement of the diaphragm 16. Outboard of the cavity 40, the reference surface 38 includes a pressure pad 42. The pressure pad is a flat region inside of the folded seal to compress, but not deform, the diaphragm 16. It functions to promote flattening of diaphragm 16 while limiting impacts of fold seal on the control of the diaphragm 16.

Outboard of the pressure pad 42, the reference surface 38 includes a cap clamping surface 44. The reference surface 38 includes a cap step 46 which includes an internal corner 48 and an external corner 50. This cap step 46 is located between the pressure pad 42 and the cap clamping surface 44, and defines the transition between the two surfaces. In the illustrated example, the pressure pad 42 is recessed from the cap clamping surface 44 (relative to the remainder of the cap 14).

The reference surface 38 is described with reference to FIG. 3 in terms of its two-dimensional profile. It will be understood that the reference surface 38 is in actuality a three-dimensional entity and may be a body of revolution (e.g., about central axis "A"), or other closed perimeter shape.

A reference port 52 is formed in the reference cap 12, in fluid communication with the cavity 40.

The diaphragm 16 has opposed sides referred to as reference and process sides, with the process side facing the body 12 and the reference side facing the cap 14. The outer perimeter of the diaphragm 16 is secured between the body 12 and the cap 14.

FIG. 2 depicts the fluid control valve 10 in an assembled condition. The body 12 and the cap 14 are clamped together. For example, threaded fasteners, an external clamp, a mechanical joint or interference fit, or even welding or adhesives may be employed to clamp the body 12 and the cap 14 together. The diaphragm 16 is clamped between the reference surface 38 and the process surface 18.

Figure 6:
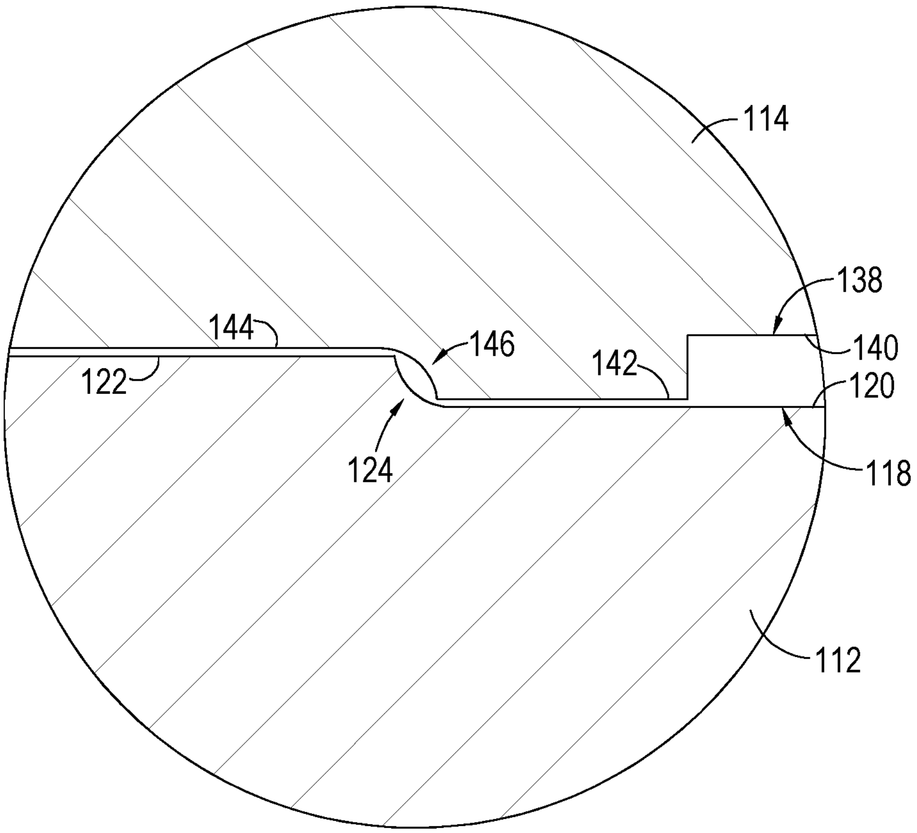
FIG. 6 is a cross-sectional view of an alternative fluid control valve.

An inverse relationship of the geometry of the body 12 and the cap 14 as possible. For example, FIG. 6 illustrates an alternative body 112 and an alternative cap 114. These are similar in construction to the body 12 and cap 14 respectively.

The process surface 118 includes a central portion 120, a body clamping surface 122, and a body step 124. In the illustrated example, the central portion 120 is recessed from the body clamping surface 122 (relative to the remainder of the body 112).

The cap 114 has a reference surface 138 including a cavity 140 pressure pad, 142, cap clamping surface 144 and cap step 146. In the illustrated example, the pressure pad 142 protrudes from the cap clamping surface 144 (relative to the remainder of the cap 114).

Figure 7:
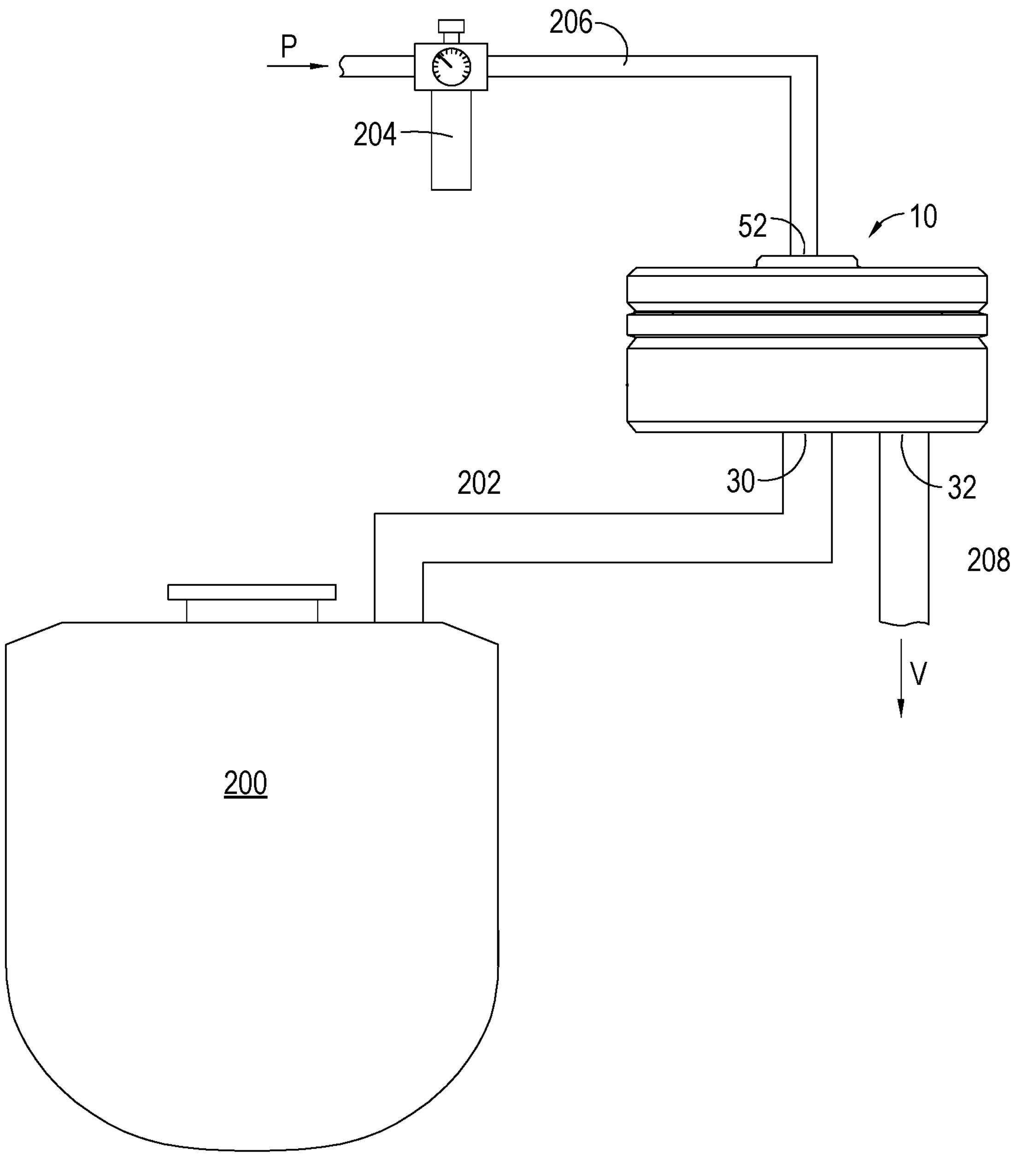
FIG. 7 is a diagram of a fluid process system incorporating a fluid control valve.

The fluid control valve may be used in various applications. One example is shown in FIG. 7. The inlet port 30 is connected to a process pressure stream in a known manner, the reference port 52 is connected to a reference pressure, and the outlet port 32 is vented appropriately. In the example of FIG. 7, the inlet port 30 may be connected to a process reactor 200 of a known type by a process line 202. The reference port 52 may be connected to a known type of device for generating a reference pressure, such as a pneumatic pressure regulator 204, by a line 206, which is in turn connected to a reference pressure source such as compressed instrument air or a gas cylinder "P". The outlet port 32 may be vented to atmosphere "V" by a simple vent line 208. During normal balanced or modulating mode the diaphragm 16 is drawn into a sealing relationship with the outlet orifices 34 due to the pressure differential between the vent pressure and reference pressure. When the process pressure exceeds the reference pressure the diaphragm 16 is persuaded away from the outlet orifices 34 thereby allowing venting.

Figure 4:
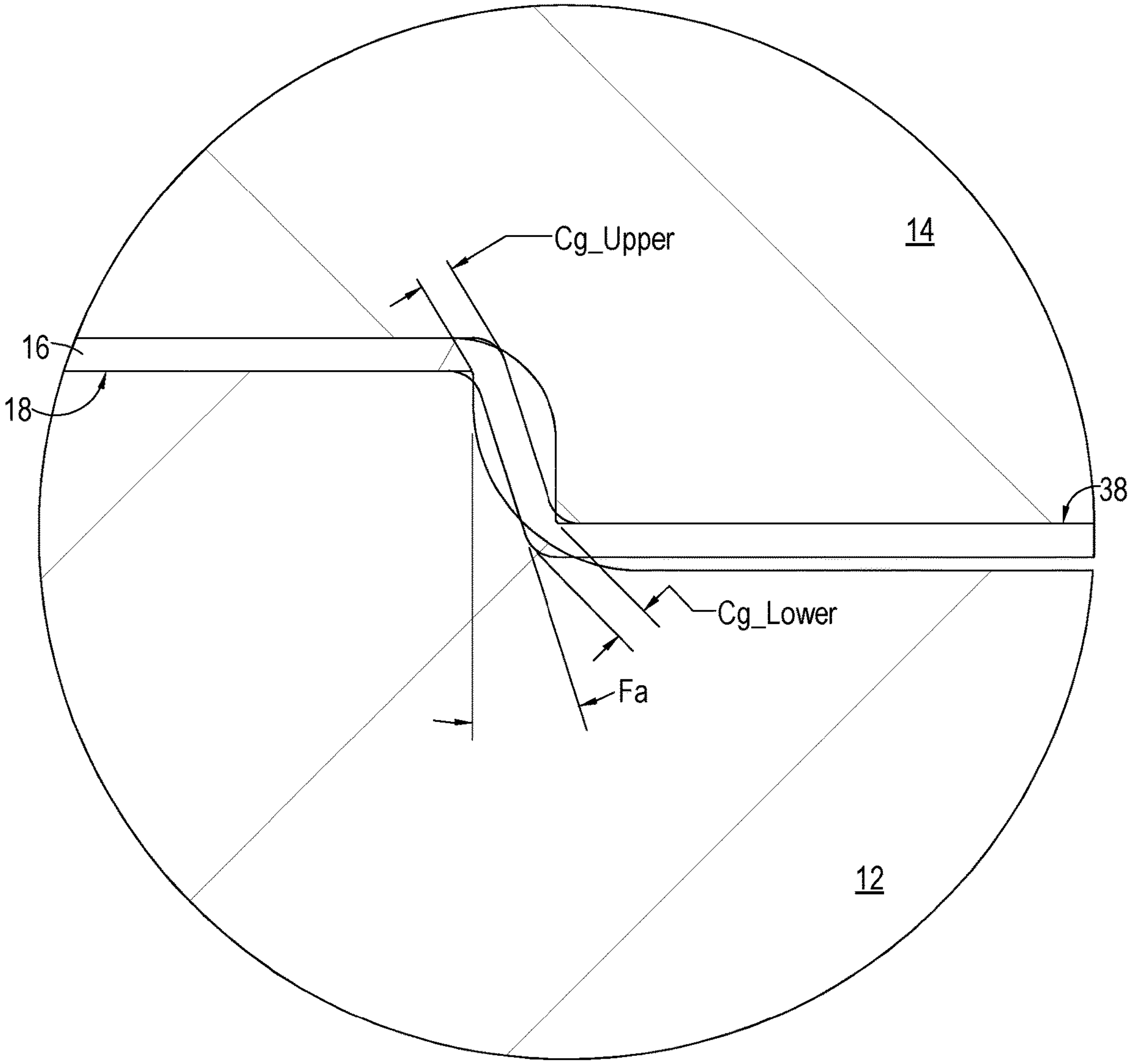
FIG. 4 is an enlarged view of FIG. 3, showing details of a diaphragm.
Figure 5:
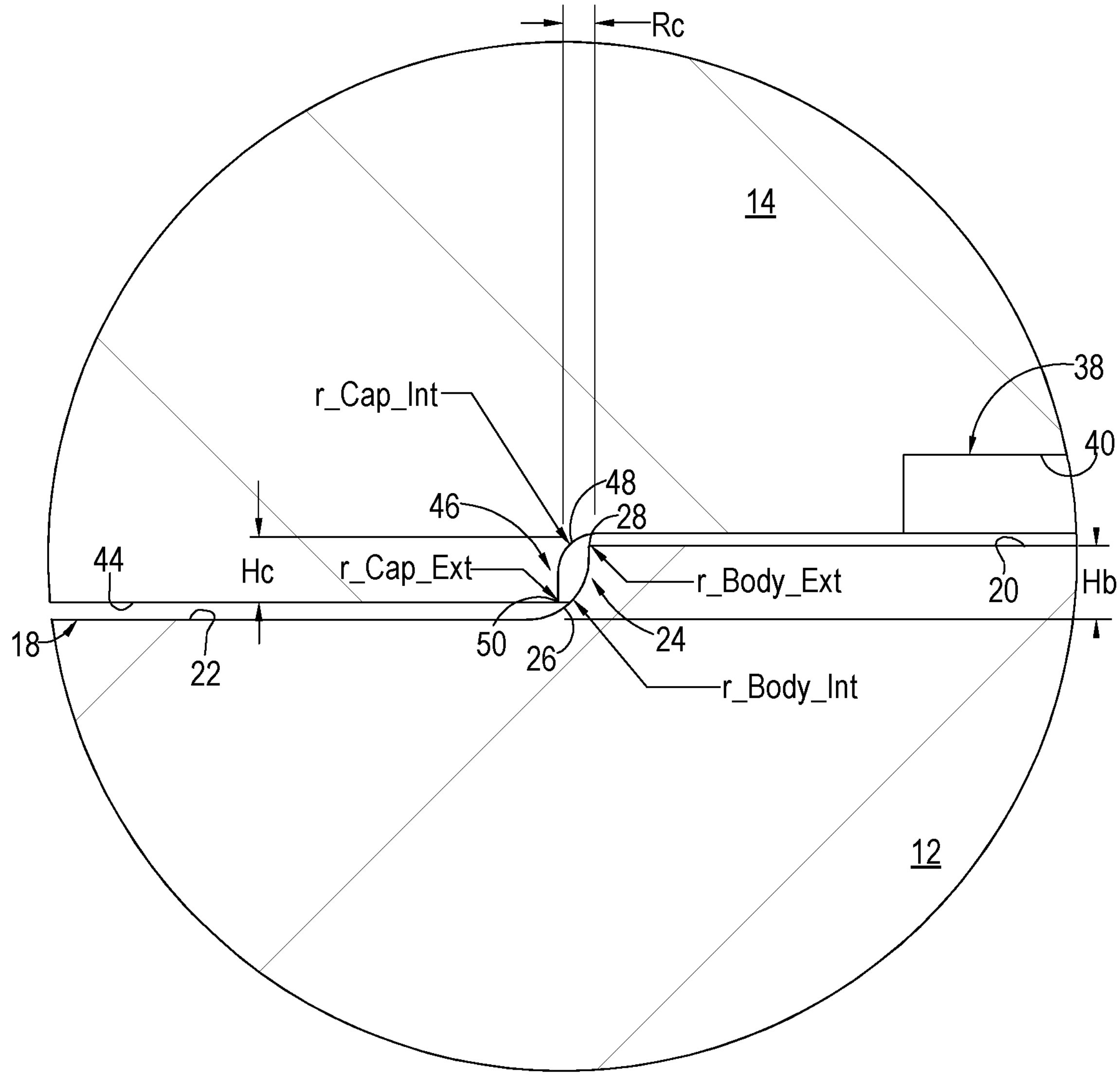
FIG. 5 is another enlarged view of FIG. 3, with the diaphragm removed.

The following definitions and dimensions, illustrated in FIGS. 3-5, are relevant to the description of the fluid control valve features:

Dc: Seal Diameter, Cap
Db: Seal diameter, Body
Fdd: Free diaphragm diameter
Hc: Seal height, Cap
Hb: Seal height, Body
Rc: Radial clearance.
Dt: Diaphragm thickness
Fold Angle (Fa): The resultant angle from normal that the diaphragm 16 takes at the sealing region
Cg_upper: Compression gap, uppermost
Cg_Lower: Compression gap, Lowermost
r_Cap_Ext: External seal radius on cap
r_Cap_Int: Internal seal radius on cap
r_Body_Ext: External seal radius on Body
r_Body_Int: Internal Seal radius on Body The sealing performance of the fluid control valve 10, specifically the leak tightness of the seal between the body 12 and the diaphragm 16, and the diaphragm 16 and the cap 14, may be enhanced by the inclusion of one or more geometric features, described below. Unless otherwise noted, any of the features may be used in conjunction with any of the other features.

Figure 8:
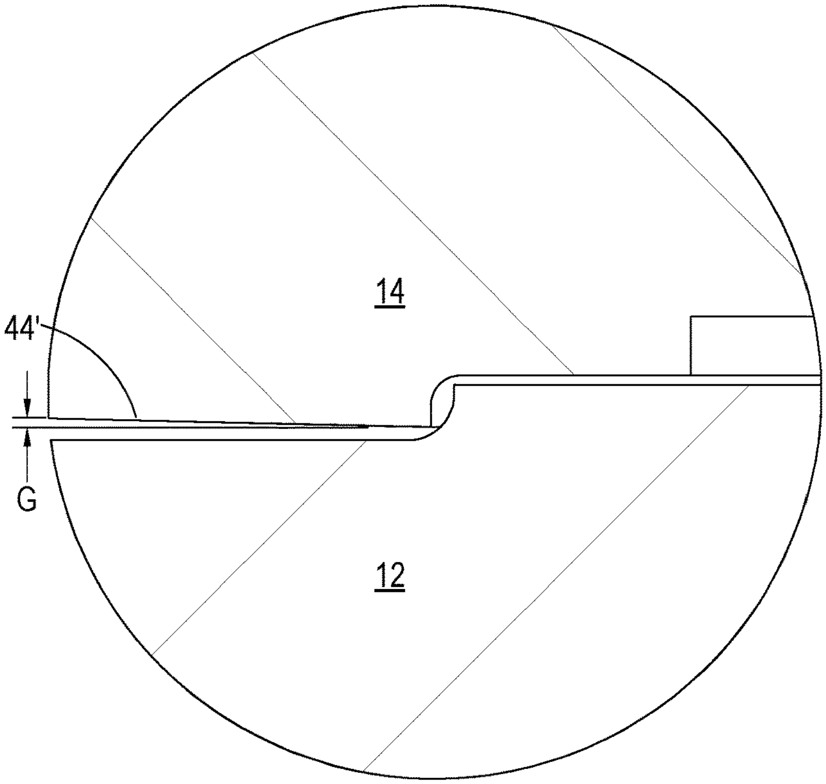
FIG. 8 is an enlarged cross-sectional view of a fluid control valve, showing a tapered clamping surface.
Figure 9:
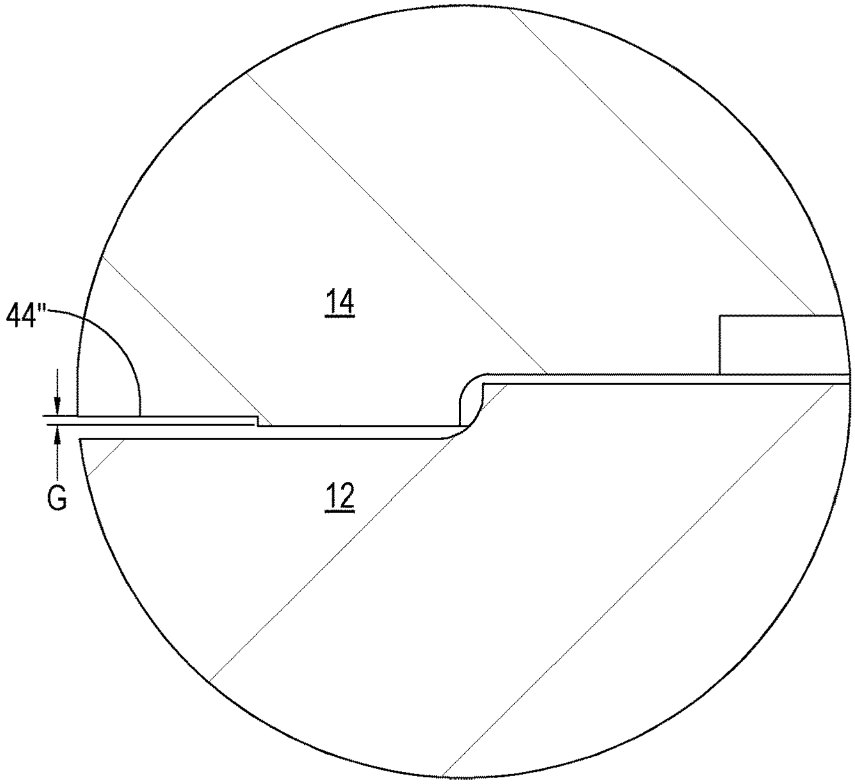
FIG. 9 is an enlarged cross-sectional view of a fluid control valve, showing a rebated clamping surface.

1) Diaphragm thickness should be less than radial clearance. This provides diaphragm shear protection.
2) In preferred examples, body seal height Hb should be greater than or equal to cap seal height Hc. This ensures that the compression at the pressure pad 42 is present, while also ensuring that the innermost folded seal is uncompromised due to tolerance stackup. In preferred examples, Hc would be between 95-99 percent of Hb.
3) Preferably, the gasket stress at the pressure pad 42 should be less than, or slightly greater than, the yield stress of the diaphragm material. In one example, the gasket stress may be from 80 percent to 110 percent of the yield stress.
4) Seal external corner radius (r_Cap_Ext) radii should be minimized to encourage localized pressure points at the seal. In one example, it may be 0.015 in. or less. In a preferred example, it may be 0.003 in. or less.
5) r_Body_Ext should be greater than r_Cap_Ext, to reduce friction on the diaphragm 16 and encourage the material to move easily across the corner, as the seal is created.
6) The surface roughness of the pressure pad 42, diaphragm 16, and surrounding areas should be minimized, with values typically less than 32 microinches Ra, with a preferred roughness of less than 12 microinches Ra. This limits the friction on the diaphragm 16, allowing it to move outward more easily during installation, aiding in directing the diaphragm distortion in an outward direction.
7) Cap and body seal diameters, diaphragm thickness, as well as seal heights should be chosen such that the fold angles Fa generated are from 45 degrees to 5 degrees, with a preferred range from 10 to 25 degrees.
8) Cap and body seal diameters, diaphragm thickness, corner radii, as well as seal heights should be chosen such that the lower compression gap (Cg_lower) is less than the thickness of the diaphragm 16 to ensure compression on the diaphragm 16 at that location.
9) Cap and body seal diameters, diaphragm thickness, corner radii, as well as seal heights should be chosen such that the upper compression gap (Cg_upper) is greater than the thickness of the diaphragm 16 to allow the diaphragm to move/stretch across this gap unobstructed.
10) Cap and body seal diameters, diaphragm thickness, corner radii, as well as seal heights should be chosen such that the upper compression gap is larger than the lower compression gap and the diaphragm thickness, as to focus diaphragm distortion away from the control surface. Stated another way, Cg_Upper greater than diaphragm thickness, and diaphragm thickness greater than Cg_Lower.
11) Hardness of diaphragm material should be less than or equal to the hardness of the body and cap materials as to promote the diaphragm 16 being the primary component that distorts under compression. This allows for the body and cap components to be more re-usable.
12) Cap and body seal diameters, diaphragm thickness, corner radii, as well as seal heights should be chosen such that compression gap Lower (Cg_Lower) is between 25-75 percent of diaphragm thickness, or alternatively between 15-75 percent. This ensures that stresses achieved at this location are well within the plastic deformation region of the stress-strain curve.
13) Sealing may be enhanced by configuring the cap clamping surface 44 to compensate for a bowing deflection that may occur when the body 12 and cap 14 are clamped together with bolts. More specifically, the cap clamping surface may incorporate a relief at its outboard portion to ensure that clamping pressure is concentrated at its inboard portion. FIG. 8 shows an example of a cap clamping surface 44' incorporating taper, resulting in an outboard gap "G" (compared to a purely parallel surface). FIG. 9 shows an example of a cap clamping surface 44" incorporating a rebated portion, resulting in a similar outboard gap G.

Materials of Construction

The materials may be selected to suit a particular application based on requirements including but not limited to: temperature, pressure, and chemical compatibility. In chemically demanding environments, metals are preferred.

The body 12 and diaphragm 16 should be made from the same materials, simplifying chemical compatibility issues that may arise from various process fluids. Suitable materials include, but are not limited to, stainless steels and some of their derivative high-nickel alloys. For example, SAE316L, SAE304, INCONEL, MONEL, or HASTELLOY.

The cap 1 may match the body material, but may deviate, for example to reduce cost. For example, an INCONEL body 12 and diaphragm 16 may be paired with a 316 stainless steel cap 14. Should the cap and body materials differ, the cap material should be chosen such that it has sufficient strength and/or hardness to complete the seal without damaging itself.

The materials should be ductile enough to withstand plastic deformation without fracture.

Dimensions of successful example valve: In order to provide a sense of scale of one preferred example, some example dimensions are provided below, in inches.

Table 1, Example Valve

| Abbreviation | Dimension | Units | Range |
|---|---|---|---|
| Dc | Seal diameter, Cap | in | 1.26-2.1 |
| Db | seal diameter, Body | in | 1.23-2.06 |
| Fdd | Free diaphragm diameter | in | 1.03-1.72 |
| Hc | Seal height, Cap | in | .021-.036 |
| Hb | Seal Height, body | in | .022-.037 |
| Rc | Radial clearance | in | .011-.019 |
| Dt | Diaphragm Thickness | in | .003-.007 |
| Fa | Fold angle, Body | deg. | 15-26 |
| Pw | Pressure Pad width | in | .112-.188 |
| Ra_Face | Surface roughness of control surface | | <10Ra |
| r_cap_Ext | External corner radius, Cap | in | 0.0005-.003 |
| r_body_Ext | External corner radius, Body | in | .003-.007 |
| r_cap_Int | Internal corner Radius, cap | in | .010-.020 |
| r_body_Int | Internal corner Radius, body | in | .015-.030 |
| Cg_Upper | Compression Gap, upper | in | .004-.007 |
| Cg_Lower | Compression gap, Lower | in | .001-.0045 |

While the above dimensions represent one successful example, this design can be scaled accordingly, with chosen diaphragm thickness being the primary driving dimension that would determine appropriate compression gaps. Chosen diaphragm thickness would be driven by valve pressure requirements and necessary flow rates. Free diaphragm diameter Fdd would increase as valve flow capacity increases. This could be necessary to design a valve that was capable of handling much larger or smaller flow rates, or when the process fluid would require such changes.

The diaphragm sealing mechanism described herein is capable not only of sealing "leaky" gasses without the use of polymeric or elastomeric seals, but also can steer any metal distortion away from the control surface of the valve. This system works to tension the diaphragm over the control surface while creating a leak free seal on the control diaphragm.

The foregoing has described a fluid control valve. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A fluid control valve, comprising: a metallic body, including: a process surface, including: a central portion; a body clamping surface adjacent the central portion; and a body step between the central portion and the body clamping surface, the body step including an internal corner and an external corner; at least one inlet orifice communicating with the process surface; at least one outlet orifice communicating with the process surface; an inlet port disposed in fluid communication with the at least one inlet orifice and adapted to be coupled in fluid communication with a fluid at a process pressure; and an outlet port disposed in fluid communication with the at least one outlet orifice; a metallic cap including a reference surface and a reference port disposed in fluid communication with the reference surface, the reference port adapted to be coupled in fluid communication with a fluid at a predetermined reference pressure, wherein the reference surface includes: a cavity; a pressure pad outboard of the cavity; a cap clamping surface; and a cap step between the pressure pad and the cap clamping surface, the cap step including an internal corner and an external corner; and a metallic diaphragm constrained between the body and the cap and arranged such that, in response to the process pressure being higher than the reference pressure, a fluid flow path will be open from the at least one inlet orifice to the outlet orifice, and in response to the reference pressure being higher than the process pressure, the flow path will be closed.

2. The fluid control valve of claim 1, wherein: the central portion protrudes beyond the body clamping surface; and the pressure pad is recessed from the cap clamping surface.

3. The fluid control valve of claim 1, wherein: the central portion is recessed from the body clamping surface; and the pressure pad protrudes from the cap clamping surface.

4. The fluid control valve of claim 1, wherein: a thickness of the diaphragm is less than a radial clearance defined between the body step and the cap step.

5. The fluid control valve of claim 1, wherein a seal height of the body, measured between the central portion and the body clamping surface, is greater than or equal to a seal height of the cap, measured between the pressure pad and the cap clamping surface.

6. The fluid control valve of claim 5, wherein the seal height of the cap is from 95 to 99 percent of the seal height of the body.

7. The fluid control valve of claim 1, wherein: a radii of the external corner of the cap step is 0.015 in. or less.

8. The fluid control valve of claim 1, wherein: a radii of the external corner of the cap step is 0.003 in. or less.

9. The fluid control valve of claim 1, wherein: a radii of the internal corner of the body step is greater than a radii of the internal corner of the cap step.

10. The fluid control valve of claim 1, wherein: a surface roughness of the pressure pad, diaphragm, and surrounding areas of the body and the cap is 32 microinches Ra or less.

11. The fluid control valve of claim 1, wherein: a surface roughness of the pressure pad, diaphragm, and surrounding areas of the body and the cap is 12 microinches Ra or less.

12. The fluid control valve of claim 1, wherein: the diaphragm passes between the body step and the cap step at a fold angle measured from a direction normal to the body clamping surface, and the fold angle is from 45 degrees to 5 degrees.

13. The fluid control valve of claim 1, wherein: the diaphragm passes between the body step and the cap step at a fold angle measured from a direction normal to the body clamping surface, and the fold angle is from 10 degrees to 25 degrees.

14. The fluid control valve of claim 1, wherein a lower compression gap, measured between the external corner of the cap and the internal corner of the body, is less than a thickness of the diaphragm.

15. The fluid control valve of claim 1, wherein a lower compression gap, measured between the external corner of the cap and the internal corner of the body, is from 15 percent to 75 percent of a thickness of the diaphragm.

16. The fluid control valve of claim 1, wherein an upper compression gap, measured between the internal corner of the cap and the external corner of the body, is greater than a thickness of the diaphragm.

17. The fluid control valve of claim 1, wherein an upper compression gap, measured between the internal corner of the cap and the external corner of the body, is greater than a lower compression gap, measured between the external corner of the cap and the internal corner of the body.

18. The fluid control valve of claim 1, wherein a hardness of the diaphragm is less than or equal to a hardness of the body and the cap.

* * * * *